(12) United States Patent
Harvey et al.

(10) Patent No.: US 6,233,668 B1
(45) Date of Patent: May 15, 2001

(54) CONCURRENT PAGE TABLES

(75) Inventors: Michael S. Harvey, Hollis; James Alan Woodward, Merrimack; Wayne M. Cardoza, Amherst, all of NH (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/428,014

(22) Filed: Oct. 27, 1999

(51) Int. Cl.$^7$ ..................................................... G06F 12/08
(52) U.S. Cl. ............................ 711/206; 711/147; 711/209
(58) Field of Search ................................... 711/147, 206, 711/209

(56) References Cited

U.S. PATENT DOCUMENTS

| | | | |
|---|---|---|---|
| 4,356,549 | * 10/1982 | Chueh | 711/216 |
| 4,985,825 | 1/1991 | Webb, Jr. | 364/200 |
| 4,991,082 | 2/1991 | Yoshizawa et al. | 364/200 |
| 5,349,651 | 9/1994 | Hetherington et al. | 395/400 |
| 5,652,854 | 7/1997 | Wong | 395/416 |

OTHER PUBLICATIONS

Harvey et al., Extending Open VMS for 64–Bit Addressable Virtual Memory, *Digital Technical Journal,* vol. 8, No. 2 (1996).

* cited by examiner

Primary Examiner—Do Hyun Yoo
Assistant Examiner—Mehdi Namazi
(74) Attorney, Agent, or Firm—Cesari and McKenna, LLP

(57) ABSTRACT

Each processor in a multi-processor system includes a process page-table-base register and a system page-table-base register. Each register identifies a different page frame containing a different instance of a top-level subtable in a multi-level page table, and both instances' contents map their respective, different page frames to the same virtual page. A first of the instances, to which the process page-table-base register refers, is used to translate virtual addresses in a process-private range, while the second instance is used for shared-range translation. When a context switch occurs, the content of the process page-table-base register is changed in accordance with the process to whose operation the processor is turning, but that of the system page-table-base register remains unchanged. Parts of the shared space are replicated in different local memory modules, and processors in different locales have different contents in their system page-table-base registers to identify different top-level-subtable instances, which map some shared-space virtual pages to different physical page frames.

57 Claims, 9 Drawing Sheets

CONCURRENT PAGE TABLES

CROSS-REFERENCE TO RELATED APPLICATION

This application is related to commonly assigned U.S. patent application Ser. No. 08/642,368, filed on May 3, 1996, now U.S. Pat. No. 6,061,773, by Michael S. Harvey and Karen L. Noel for a Single Private/Shared Virtual Memory Boundary. We hereby incorporate that application in its entirety by reference.

BACKGROUND OF THE INVENTION

The present invention concerns memory management. It particularly concerns ways of facilitating the use of different memory-allocation policies for different parts of a virtual-memory space.

Computer programs stored in a persistent memory device such as a computer disk include references, which specify the memory locations of data objects, functions, etc. The compiling and linking that result in such an executable program are typically performed independently of the compiling and linking that result in other executable programs. So nothing prevents different executables from using identical references to refer to different data objects. This would present no problem if the different programs were never to be present in physical memory simultaneously. But the reality is that a computer typically runs many different programs concurrently. Such different programs are typically referred to as "processes" in this context, and different processes using some identical references would interfere with each other in the absence of what is known as "virtual addressing."

FIG. 1 illustrates how one example of virtual addressing can be implemented. A typical computer system 10 includes, among other things, a central processing unit 12, a memory 14, and a bus 16 by which the central processing unit 12 and memory 14 communicate with each other. As is well known, a central processing unit's execution unit 18 operates by repeatedly fetching instructions from the memory 14 and executing those instructions. Often, such an instruction's execution includes reading data from or storing data to memory locations that a memory reference specifies.

But the memory reference in a given process is considered a virtual address, i.e., a value that is not itself the actual, physical address of the referred-to data object's location in memory 14, but rather a value from which that location's address can be determined. The translation from virtual address to physical address is the job of a memory-management unit 20, in cooperation with the operating system's memory-allocation software. Together, they treat a given process's virtual-address space as divided into "pages." When execution of a step in a process involves a reference, the memory management unit consults a translation buffer 22, which caches associations between various of the process's virtual-address pages and the physical-memory "page frames" in which those pages have been stored. A "translation-buffer hit" is said to occur if the translation buffer 22 contains the required association. A translation-buffer hit results in the translation's being completed. The location specified by the thereby-identified physical address is thereupon accessed.

If buffer 22 does not contain the required association, a "translation-buffer miss" is said to occur, and operation is interrupted so that the required association can be fetched from the process's page table stored in memory. FIG. 1 depicts the memory 14 as containing page tables 24, 26, and 28 that are specific to the three currently running processes that the drawing represents by physical-memory regions 30, 32, and 34. Of course, this representation diverges somewhat from reality, since the addresses of physical-memory segments actually allocated to a given process are not in general contiguous, and they may well be interspersed with the memory segments allocated to other processes.

Although a number of processes are concurrently active, the central processing unit can at a given instant be executing only one process's instructions. A typical approach to concurrent processing is therefore to divide each process's execution into time slices interspersed with other processes' time slices. When the central processing unit 12 turns to a new process after having completed a previous process's time slice, it performs a "context switch." A context switch is the processor's replacement of the contents of the program counter and various other registers 36 with the values that those registers contained at the end of the new process's last time slice. As part of the context switch, the contents of a page-table-base register 38 are replaced with a value from which, as will be explained below, a physical address in the new process's page table can be determined.

Now, the code for most processes includes calls to functions within the operating system. Because the different processes share the same operating-system code and data, the virtual addresses that refer to such code and data should map to physical addresses containing the same contents in all processes. So it is typical for a computer system's memory management to reserve a certain range of virtual addresses for shared code and data. A virtual address that falls within this range is always mapped to the same physical address, independently of the process in whose context it occurs.

In the description so far, a tacit assumption has been that the page tables always contain all of the required associations between a given process's virtual-address pages and the physical page frames that contain those pages. But this is true only insofar as there actually is a page frame within main memory 14 that contains the requested virtual-address page. If there is none, then the routine employed by the memory management unit to obtain page-table entries from a page table will terminate in favor of an operating-system routine whose purpose is to allocate memory to various processes. Specifically, the operating system is requested to allocate a page frame to the current process and, if necessary, place into that page frame virtual-address-page contents typically held in persistent storage.

From a performance viewpoint, the particular choice of page frame thus allocated is not very important in the typical system of the type that FIG. 1 depicts. This is because the main memory 14 is almost invariably "random-access" memory in the sense that the cost of a given access is largely independent of its particular memory location. But this position independence is not true of FIG. 2's multiprocessor system, in which various memory modules 44 and 46 impose different access costs. For one central processing unit 48, the cost of accessing a location in memory 44 is relatively low. Central processing unit 48 and memory 44 may share a common bus, for instance. There may additionally be further central processing units, not shown, for which the cost of access to memory 44 is similarly low. Memory 44 can be thought of as "local" to such processors.

For another central processing unit 50, though, access to memory module 44 is more costly: with respect to processor 50, module 44 is "remote." In the example, the reason for the extra cost is that the distance from central processing unit 50 to module 44 is relatively great and therefore requires port circuitry 52 and 54 to communicate at the lower speed to which the intervening channel 56 is limited. So it may cost central processing unit 50 considerably less to access memory module 46 than to access memory module 44. Similarly, central processing unit 48 may find accesses of memory module 44 less expensive than accesses of memory module 46.

Memory-allocation schemes may take these different costs into account. Allocation routines in the operating-system software executing on central processing unit 48 may preferentially allocate page frames in memory module 44 rather than in memory module 46, to which that central processing unit 48 also has access. But the division of labor among processors may render the resultant cost advantage illusory. To maximize processor utilization, a multiprocessor system may assign a given process's execution to different processors during different time slices. So memory preferentially allocated in memory module 44 by central processing unit 48 may subsequently need to be accessed by central processing unit 50 executing the same process in a different time slice. Also, different "threads" of a single process may run simultaneously on different processors. (Different threads of a given process employ the same memory space and programming but operate in the context of program counters and call stacks that do not in general contain the same values.) For example, processors 48 and 50 may simultaneously run threads that both reference memory module 44.

Of course, one may propose to restrict a given process's execution to the processor or processors to which a given memory module is most local. But such an approach could reduce processor utilization and compromise one of a multiprocessing system's strengths, which is that it can execute multiple threads of the same process simultaneously in some or all processors in a given system.

One way to retain multiprocessor-system advantages but reduce the cost that such non-uniform access times can exact is to replicate a process's code and data in the different locales in which the process may be executed. Now, replicating all such code and data is clearly impractical. Even if the memory-capacity impact could be ignored, such a general policy would in most systems impose an intolerable synchronization overhead for read/write data. Other overhead elements would compromise the intended performance gain, too.

Still, significant benefits can result if a replication policy is implemented selectively. The operating system's code and read-only data are attractive candidates for replication, for instance, since the resultant execution-speed advantage benefits essentially all processes. But it remains important to contain the resultant overhead so as not to compromise the intended execution-speed benefit excessively.

One element of overhead attends the page-table change that a change in the location of a process's execution can cause. It will rarely be acceptable to require that a process's code adjust its references in accordance with the particular locale in which it is being executed. So a locale change should be accompanied by a change in the correspondence between virtual and physical addresses. But changing a process's page tables as part of a context switch whenever a processor change occurs can have a significant adverse performance impact.

SUMMARY OF THE INVENTION

The invention to be described below is a way to translate virtual to physical addresses that can be used to facilitate selective address-space replication. It involves the use of a page table that is a composite of a plurality of constituent self-mapping page-tables that coincide in virtual-address space.

To fetch a page-table entry that is to be cached in its translation buffer, the processor ordinarily attempts to access the page table by way of virtual addressing. This is typical for self-mapping tables. In contrast with conventional page tables, though, a process's page table employed by the present invention consists of a plurality of substructures. Each substructure is a constituent page table that coincides in virtual-address space with other constituent page tables but is materialized in different physical-address locations, whose contents are not in general identical to those of other constituents. More specifically, the system maintains for each constituent page table a separate base-address value that identifies the associated constituent page table's physical location and is used by the system to locate that constituent page table. Each constituent page table maps that separate base-address value to a common virtual address, one to which each other constituent page table maps the different base-address value with which it is associated. Because of this virtual-address coincidence, we call such composite page tables concurrent.

The system uses each constituent page table to translate a different range of virtual addresses. Because of the page table's concurrent nature, though, the operation of fetching a page-table entry from a page whose association the translation buffer has cached can be made largely independent of the range in which the faulting virtual address falls. This is the result in embodiments in which the page table is additionally of the multi-level variety. In such embodiments, it is only when the translation buffer does not contain a translation for the table entry's page that its fetching operation will depend on the virtual-address range in which the reference to be translated falls. In such cases, a physical-address-based access may be necessary, and the physical address used for the access is determined from the appropriate one of the page-table-base values.

As will be described below, this invention is particularly advantageous in supporting the replication of shared code and data in a multiprocessor system in which memory-access cost is not uniform.

BRIEF DESCRIPTION OF THE DRAWINGS

The invention description below refers to the accompanying drawings, of which.

DETAILED DESCRIPTION OF AN ILLUSTRATIVE EMBODIMENT

Although there are many ways to implement the present invention, we will describe it by reference to a specific example. In this specific example, the number of concurrent page-table substructures is two, and the address ranges with which they are associated are respectively those of shared and private space, as will be explained below. Additionally, most implementations will exhibit a multi-level page-table structure. For the sake of concreteness we will assume FIG. 3's three-level structure, although the invention's scope is not so limited.

Figure 3:
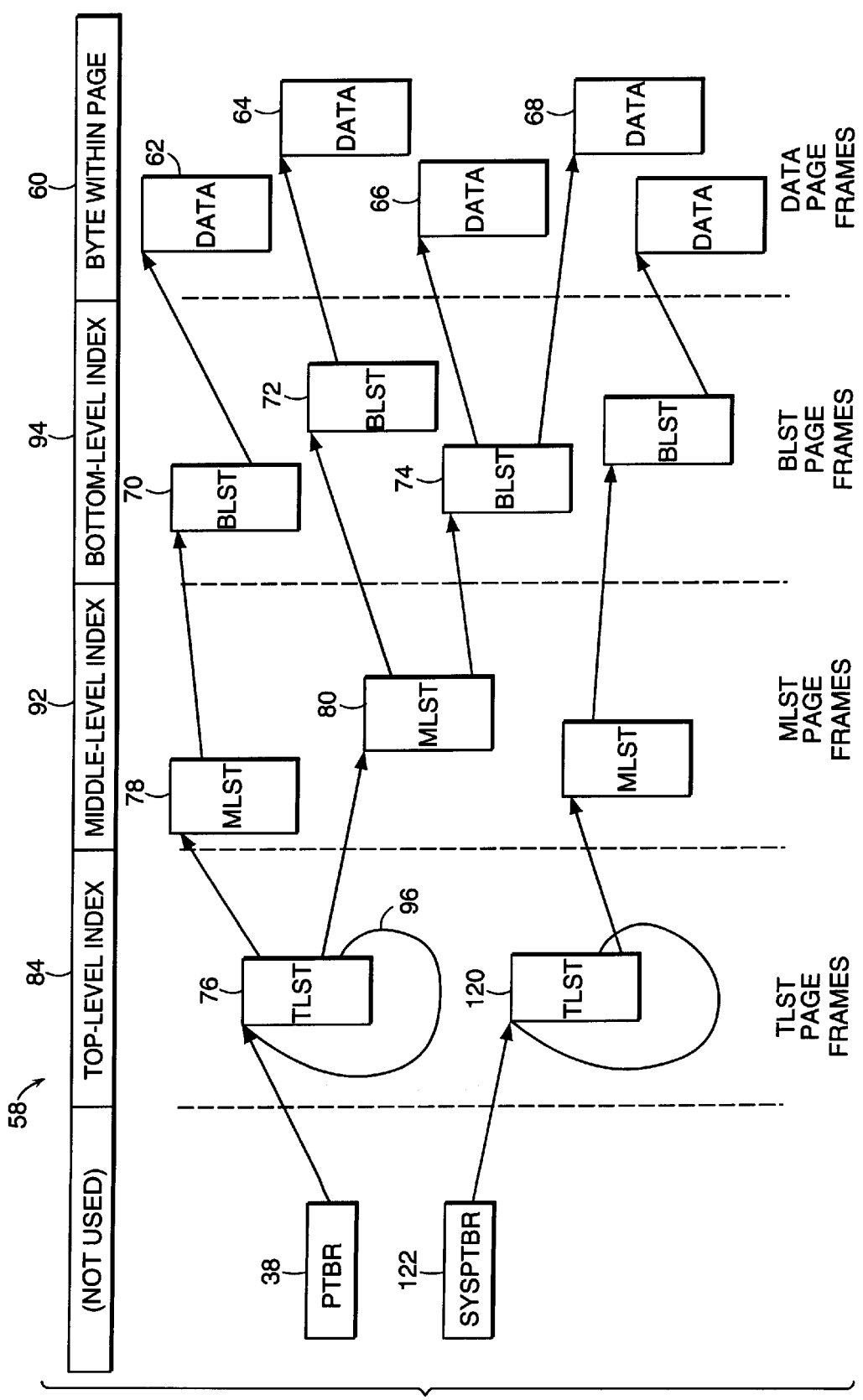
FIG. 3 depicts the relationship between an exemplary memory reference's format and entries in a multi-level page table.

Let us also assume a memory reference that is eight bytes wide, i.e., that a memory reference consists of sixty-four bits, and that these bits are interpreted in accordance with FIG. 3's format 58. Specifically, we will assume that the particular computer system's memory-management unit actually uses only the least-significant forty-three bits for addressing: it uses no bit more significant than that. The forty-three bits represent a virtual address in an eight-terabyte virtual-memory space. To access the data to which a reference refers, this virtual address must in some way be translated into a physical memory address.

To this end, each process is given a page table, whose entries indicate the physical locations of "page frames" that contain respective virtual memory "pages." As format 58 illustrates, we will assume, again merely for the sake of illustration, that the least-significant thirteen of the forty-three virtual-address bits form a field 60 that specifies locations of bytes within a memory page, i.e., that a memory page consists of $2^{13}$ (=8K) bytes of memory. (In format 58, bit significance increases from right to left.) In the translation, this field's contents remain unchanged, representing the referred-to object's starting location within the (8-Kbyte) page frame in which the virtual page has been materialized. The remaining thirty virtual-address bits act as a virtual-page number, and it is the purpose of the page table to associate a virtual page number with the number of the physical page frame, such as frames 62, 64, 66, and 68, in which the virtual page has been materialized.

If the page table is of the multi-level variety, the "table" is actually a set of tables, which we will refer to here as "subtables." For the sake of example, let us assume that the page table has three levels of such subtables. The page-table entries in the lowest-level subtable, exemplified by subtables 70, 72, and 74, identify physical page frames that contain the virtual-page contents. An entry in a higher-level subtable such as table 76, 78, or 80 identifies the physical locations of lower-level subtables.

Figure 1:
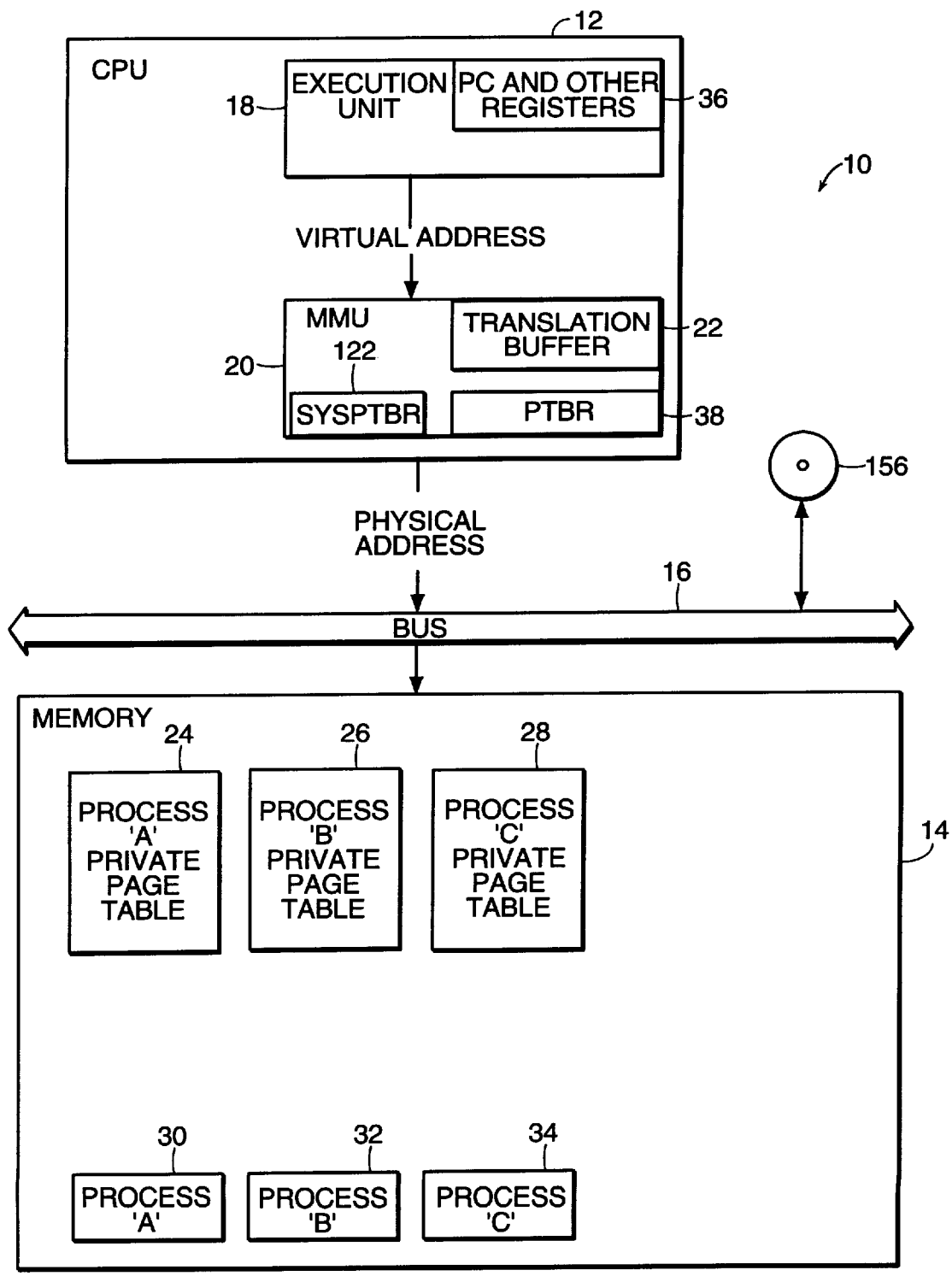
FIG. 1 is a block diagram of an exemplary computer system, showing its main-memory and persistent-storage systems along with a central processing unit that includes a memory-management system.

As was mentioned above, the illustrated embodiment employs two page-table substructures for each process, so there are two top-level subtables in physical-address space. But let us temporarily assume that there is only one such top-level table 76, one whose physical location is identified by a page-table-base register 38. FIG. 1 depicts that register conceptually as being part of the memory-management unit 20.

The most-significant ten of the forty-three virtual-address bits form a field 84 that is interpreted as an index into the top-level subtable: that table has $2^{10}$=1K entries. Let us assume that each table entry is eight bytes wide so that a table occupies 8K bytes, i.e., a single page frame. The offset into the page-table page frame 76 at which the desired page-table entry begins is found by multiplying field 84's value by eight, i.e., by the number of bytes in each entry.

Figure 4:
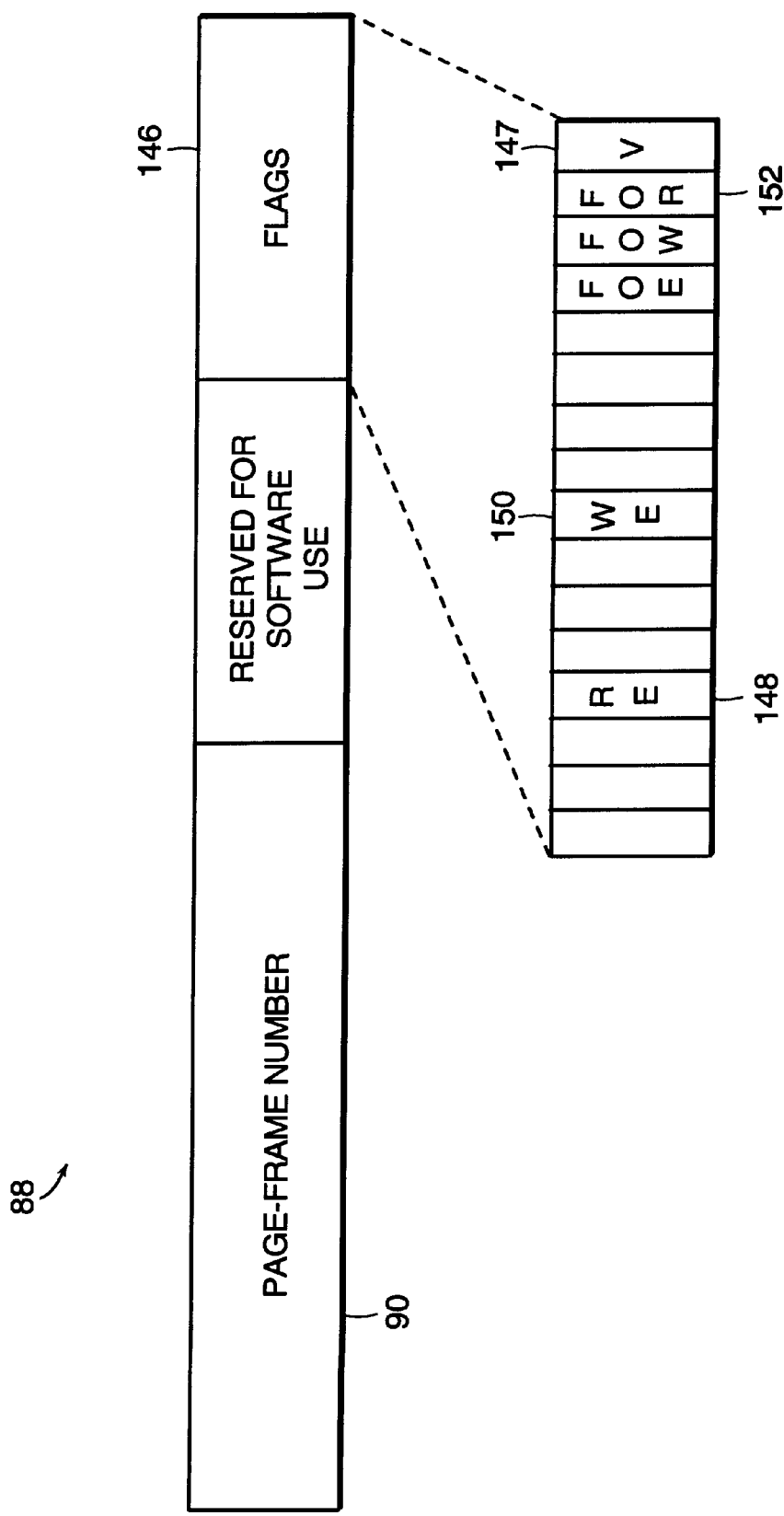
FIG. 4 is a diagram of a page-table entry used in the illustrated embodiment.

The page-table entry thereby located contains information that in some way identifies the location of a next-lower-level subtable. In the example, we assume that all subtables are the size of a page frame, so the subtable location can be identified by page-frame number. (In the illustrated embodiment, the page-frame number is the number that results from discarding the byte-within-page bits from the address of any physical location that the page frame contains.) FIG. 4 depicts an example page-table-entry format, showing it as including a field 90 that contains the page-frame number. The physical address of the location at which that page frame starts can typically be derived from the page-frame number algorithmically. In the example, we assume that start address is derived simply by appending thirteen zeroes, since $2^{13}$ bytes=8K bytes is the page-frame size. An entry in the top-level subtable thereby identified can identify a second-level subtable.

Now assume that the virtual address's next ten bits 92 are used as an index into that second-level subtable, and that the page-table entry thereby found contains the number of a physical page frame containing a lowest-level subtable. Further assume that the virtual address's third ten bits 94 are used as an index into that lowest-level subtable and that the page-table entry thereby found identifies the number of the physical page frame that contains the desired virtual page.

An advantage of a multi-level page table is that it can manage large numbers of pages but requires little table space when the number of pages is small. The arrangement just described, for example, can address $2^{30}$ virtual pages, i.e., over a billion, yet the page table for a given process may consist of as few as three subtables sized for $2^{10}$ (=1024) entries each if that process refers to only a few memory pages. In a single-level scheme with the potential to address that many pages, on the other hand, each process's page table would typically require space for enough entries to span from the lowest-numbered to highest-numbered virtual pages used, without regard to the number of pages the particular process actually requires.

As was mentioned above, systems that employ the present invention's teachings use page tables that are "self-mapping." Self-mapping is one way to place the page table itself in part of the virtual-address space that it maps. Self-mapping means that a page-table entry points to the page frame that contains it. In the particular case of the illustrated, multi-level page table, the entire page table is mapped through the use of a top-level-subtable entry that points to that subtable's page frame.

To understand this self-mapping mechanism, which the illustrated embodiment uses, consider FIG. 3's bottom-level page-table page frame 74. To be the virtual address of an entry within that page frame 74, we will require a reference to have as its bottom-level index 94 an index into the next-higher-level subtable, i.e., into a subtable whose entries all identify bottom-level subtables' page frames. Page frame 80 contains such a page table. The virtual address's middle-level index 92 must therefore be an index into the top-level subtable, which page frame 76 contains. This in turn requires that the virtual address's top-level index 84 be an index into a table that contains as an entry the number of page frame 76. As was explained above, though, the top-level index 84 is always an index into the top-level page frame, so index 84 must specify an entry in page table 76's top-level subtable that points to that page table itself FIG. 3's reference numeral 96 represents the self-mapping nature of that entry. We will require the index of this self-mapping entry to be the same in every process's page table.

To translate the subtable 74 entry's virtual address into its physical address, the above-described translation procedure is followed by starting at the top-level-subtable entry containing the self-mapping index. The top-level subtable thereby serves not only as the top-level subtable but also as the middle-level subtable, and the (ordinarily) middle-level subtable that page frame 80 contains serves in this instance as a bottom-level subtable. The byte-within-page value 60 is the index of the desired page-table entry multiplied by the number of bytes in an entry, i.e., eight in the example.

In this self-mapping scheme, therefore, the top-level-index field 84 of any page-table entry's virtual address always contains the index of the self-mapping page-table entry that FIG. 3's pointer 96 represents. By similar reasoning, it can be appreciated that the middle-level index 92 of any middle-level subtable's virtual address must also be the index of that self-mapping entry, and the virtual address of any entry within the top-level subtable must have that self-mapping index in all three of the virtual address's index fields. Finally, the virtual address of the self-mapping page-table entry must have the self-mapping index in all three of the virtual address's index fields and in the most-significant ten bits of the byte-within-page field 60. (The field's remaining three bits are zeros.)

Although the page-table structure described so far is conventional, the present invention employs what can be thought of as a plurality of such structures as constituents of a composite page table. Before we discuss that feature, though, we will consider an example application to which the invention affords particular benefit. This application is the use of different allocation policies for what is known as "private" and "shared" virtual-address space.

Figure 5:
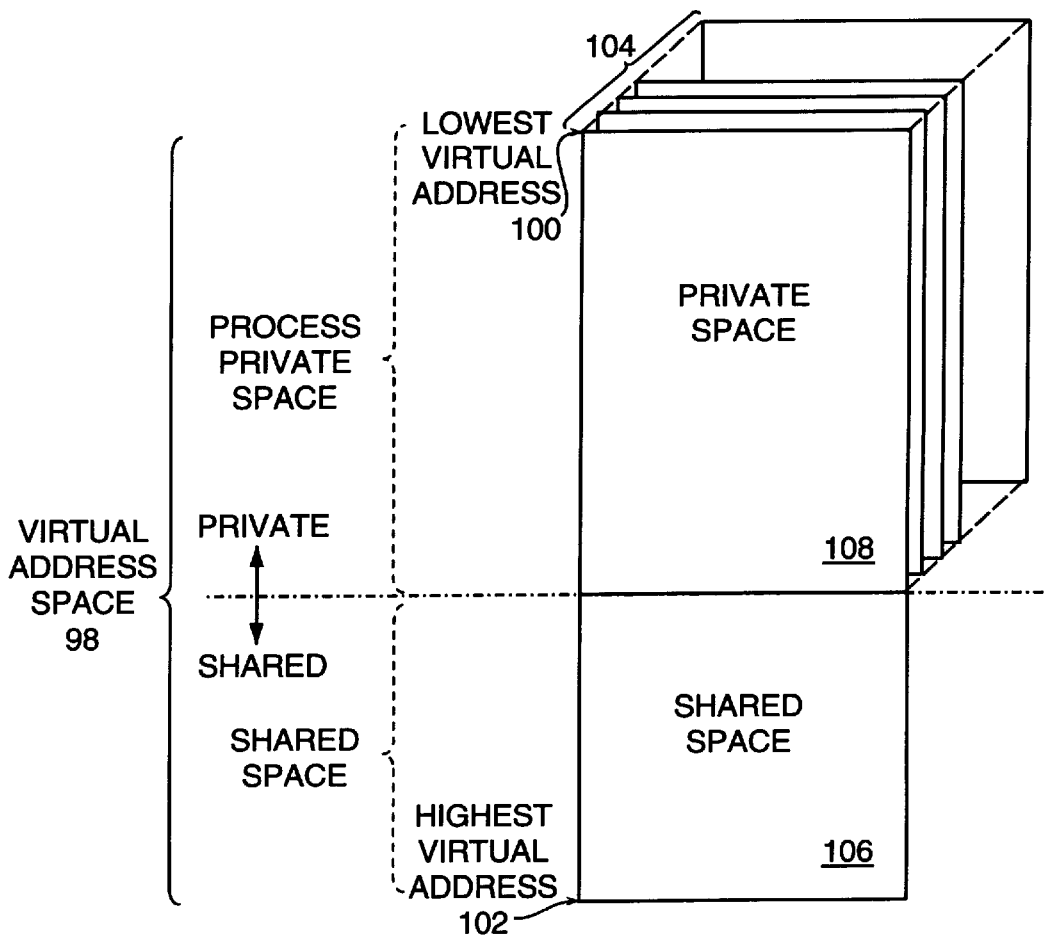
FIG. 5 is a diagram that illustrates one example of a particularly useful division of a virtual-address space into parts having different access policies.

FIG. 5 illustrates a typical division of virtual-address space 98 into private and shared segments. It depicts space in terms only of the forty-three bits that we have assumed are actually placed on address buses, not in terms of all sixty-four bits of the reference's representation in memory. This is because the remaining bits are irrelevant to the operation that we discuss here. Despite their lack of immediate relevance to that operation, the values of the more-significant, unused bits are typically assigned in a systematic manner. One approach, which the above-described Harvey et al. application describes in more detail, is to "sign-extend" the forty-three-bit address, i.e., to replicate in the more-significant bits the most-significant one of the least-significant forty-three bits.

Represented in terms of the entire sixty-four bits, the illustrated virtual-address space that the diagram represents would be split into two halves at opposite ends of a much larger space. Those two halves would be separated by a "forbidden gap," and some of the system's address-processing components that do manipulate all sixty-four bits may enforce a rule against values that fall within this gap. For present purposes, though, we will ignore such features.

The diagram's top edge 100 represents the lowest virtual address, i.e., 0, while the bottom 102 represents the highest virtual address, i.e., $2^{43}-1$ in the present example. Each process is accorded this same, identical virtual-address range. Therefore, many of the same virtual addresses are materialized in different physical-memory locations for different processes, as FIG. 5's several layers 104 indicate.

Although different processes' data referred to by the same virtual addresses are not in general stored in the same physical-memory locations, it is common practice for a certain range of virtual addresses to be reserved for shared, e.g., operating-system code and data in every process's virtual-address space. For this range of addresses, the correspondence between virtual address and physical address in single-processor systems is ordinarily the same for all processes, because they use common operating-system code and data. For this reason, FIG. 5 depicts a lower part 106 of the virtual address range as having only a single layer. This part of the virtual-address space is referred to as "shared" space, while the remainder is referred to as "private" space 108.

Now, the differences in usage patterns between shared space and common space suggest that different allocation policies be applied to them in non-uniform-memory-access systems, that is, in systems in which the access costs for different memory modules can differ from processor to processor. The typical use of shared space is to contain operating-system code and data, and every processor in a multiprocessor system will therefore need frequent access to the shared space, both independently of and on behalf of the process that it currently executes. That is, although a given processor will likely use different processes' private code and data at different times, it will use the same-shared code and data at all times. So the case for replicating at least significant portions of shared virtual-memory space in different physical local memory modules tends to be relatively strong in comparison with private virtual memory. The invention presently to be described facilitates using such different allocation policies.

To understand this, it is important to consider where in virtual-address space the (self-mapped) page table will reside. As an original proposition, there is no reason why a multi-level page table's individual subtables cannot be spread diffusely and non-contiguously about the virtual-address space. But the self-mapping approach described above dictates that a range of contiguous virtual addresses be reserved to page tables. This can be appreciated by considering the nature of a page-table entry's virtual address. As was explained above, FIG. 3's top-level index 84 for a page-table entry must always be the self-mapping top-subtable index, i.e., the index that specifies the top-level table entry 96 that contains the number of the page frame in which the top-level subtable resides. So the most-significant bits of all page-table entries' virtual addresses must be the same.

Figure 6:
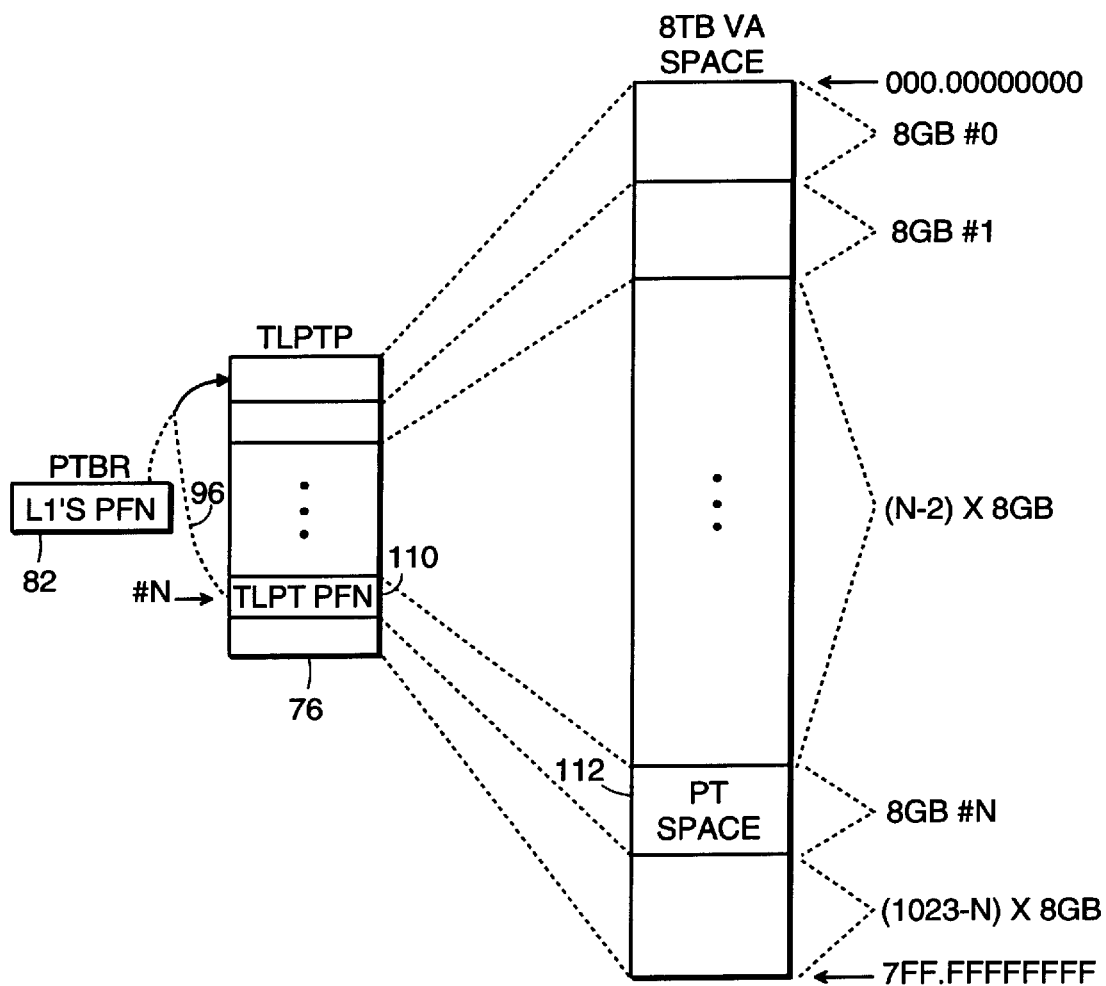
FIG. 6 is a diagram that illustrates the location of the illustrated page table in virtual-address space.

FIG. 6 illustrates this result. For the sake of concreteness we will assume that, of the 1024 indexes (0–1023) in the top-level subtable, N is the one that identifies the entry containing the number of the physical page frame in which the top-level subtable resides. Therefore, of the 1024 eight-gigabyte segments numbered 0–1023 in the eight-terabyte virtual-address space, the virtual addresses of all page-table entries must fall within eight-gigabyte segment numbered N. FIG. 6 identifies that segment by reference numeral 112.

Figure 2:
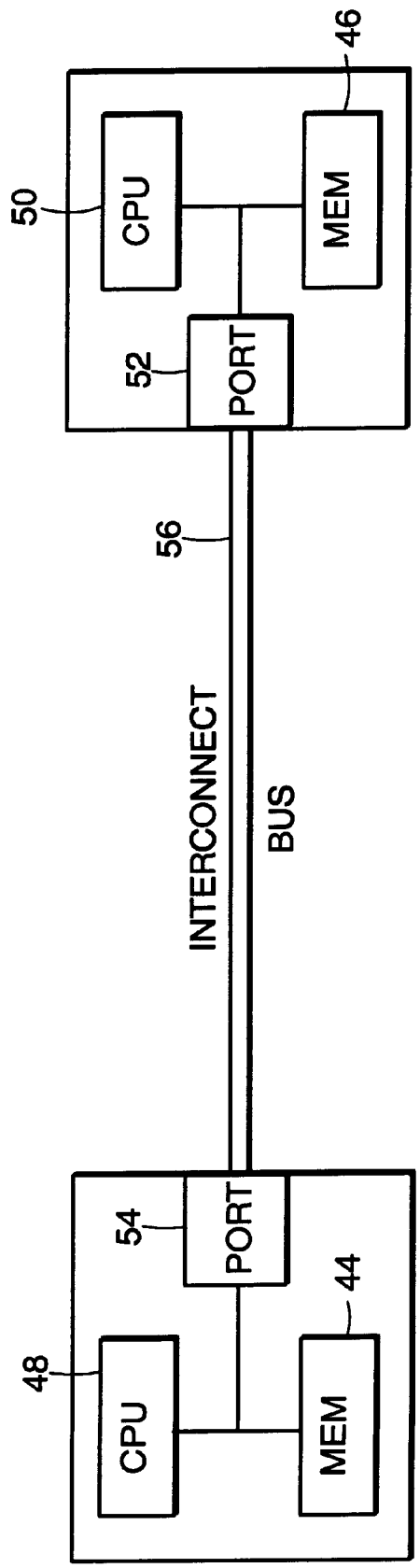
FIG. 2 is a diagram of a multiprocessor system and shows the association of various memory devices with respective processor clusters.

We are now ready to consider the particular memory-management problem that the proposed different memory-allocation policies present. Consider a context switch that occurs in FIG. 2's central processing unit 50. As was mentioned above, part of a context switch includes the step of loading into the page-table base register 38 (FIG. 1) the number of the page frame that contains the top-level subtable for the resuming process. The problem of particular interest here arises when the resuming process last executed on central processor unit 48, which was local to a different memory module 44. In accordance with the allocation policy mentioned above, much or all of the operating system, i.e., shared code and read-only data, is replicated. So, whereas the physical locations that the process's page table previously associated with such shared virtual-address space are in memory module 44, the physical locations with which it should now associate that shared space are in memory module 46. This suggests that the context switch needs to include a change in page-table entries. But burdening the context-switching operation with the need to rewrite page-table entries would seriously detract from performance and compromise the advantage that operating from more-local memory would otherwise afford. According to the present invention, though, providing a second, shared page table for each local memory largely eliminates this performance drawback.

The illustrated embodiment implements this approach in a particularly advantageous manner. It places the page tables within virtual-address space in such a manner that they straddle the boundary between private and shared space. Aspects of such straddling are described in more detail in the above-mentioned Harvey et al. application. We briefly review the salient features of that application's page-table-space positioning here and describe a slightly different positioning of the boundary.

Figure 7:
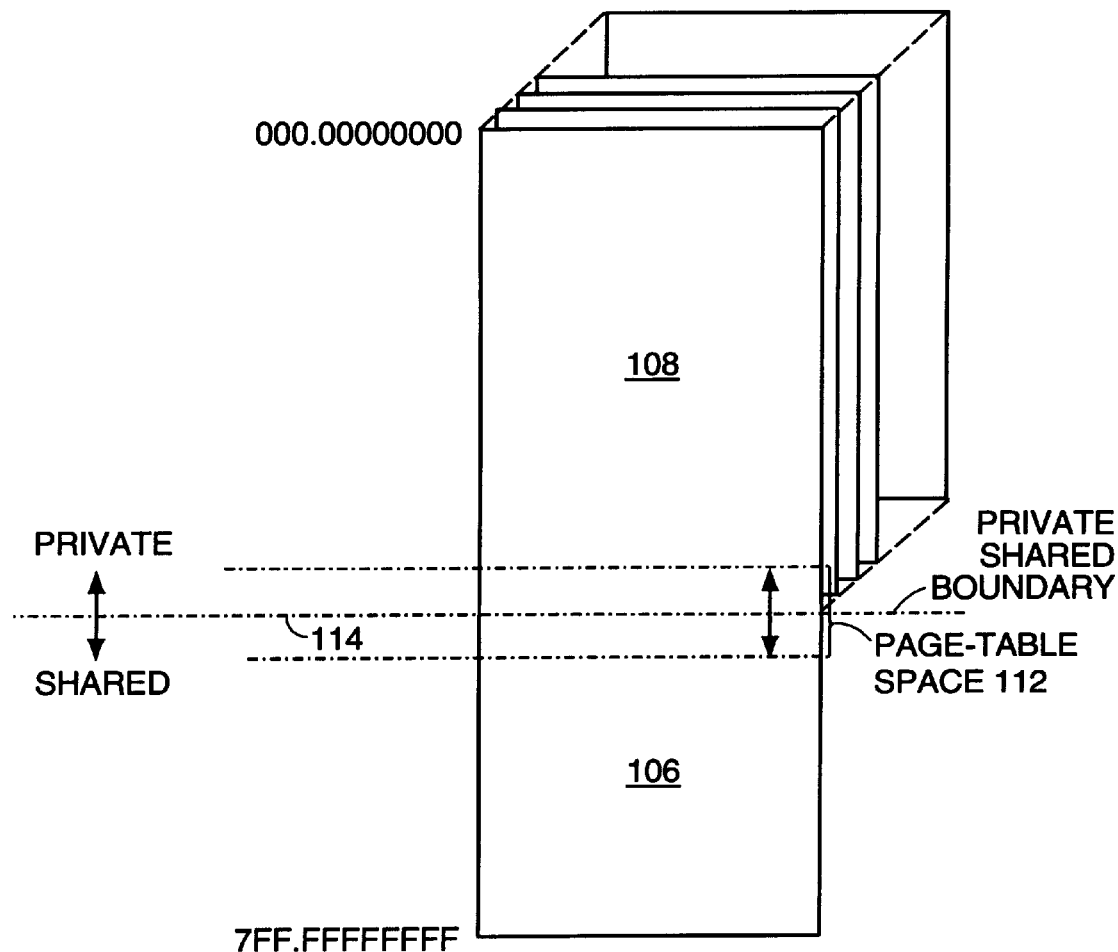
FIG. 7 is a diagram that depicts the virtual-address space's division into segments having different allocation policies.

FIG. 7 illustrates the fact that the page-table space 112 straddles the boundary 114 between private and shared virtual-address space. In other words, the subtables located at some virtual-memory locations have different versions for different processes, and each is therefore materialized in different physical memory. Naturally, any subtables that map any private space must fall on the private side of that boundary, and any subtable that maps only shared space can be permitted to fall on the shared side of the boundary.

Figure 8:
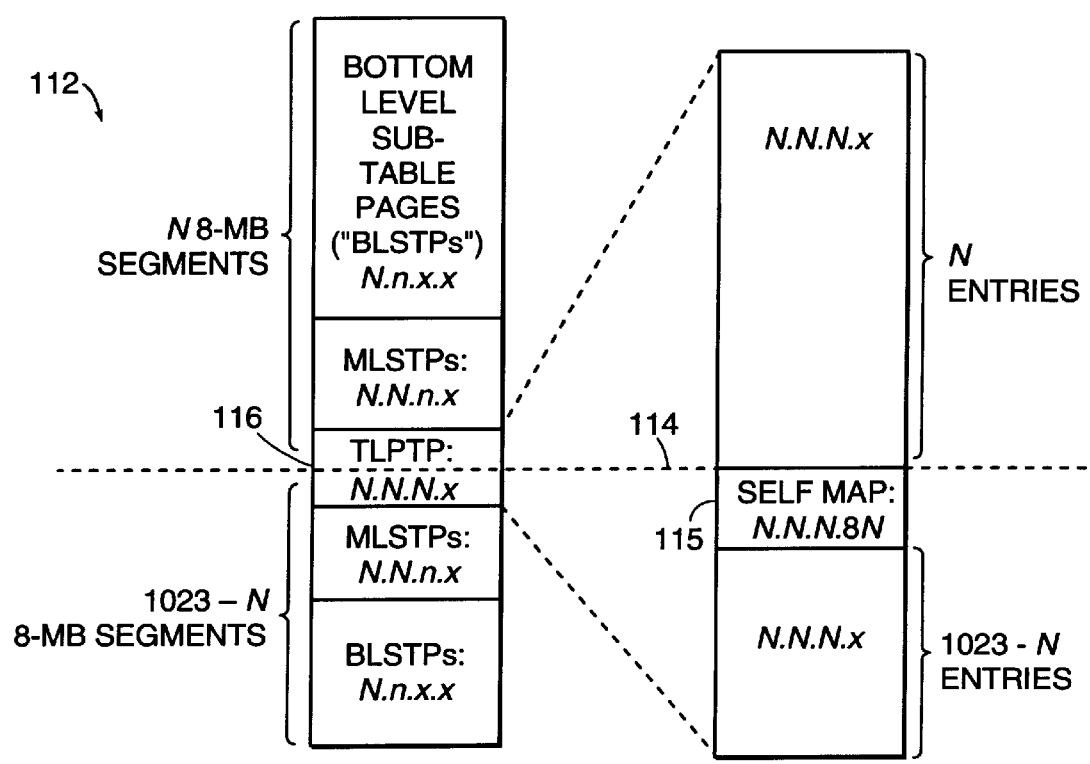
FIG. 8 is a diagram that depicts the resultant division of page-table space.

The positioning of the top-level subtable's self-mapping entry dictates the positions of all other subtables in a manner that FIG. 8 illustrates. Recall from the above discussion of the self-mapping scheme that FIG. 3's top-level index 84 in all of page-table-space 112's virtual addresses must be N, i.e., that of FIG. 6's self-mapping top-level-subtable entry 110. Since page-table-space virtual addresses are of the form N.x.x.x and we have required that the page-table space straddle the private/shared boundary, all non-page-table-space virtual addresses n.x.x.x must lie in private space if n<N and in shared space if n>N. Since all table-space entries should be private or shared in accordance with the values they map, bottom-level-subtable-entry virtual addresses Nn.x.x must lie in private space if n<N and in shared space if n>N, so FIG. 8 shows bottom-level-subtable pages on both sides of the boundary. Similarly, middle-level-subtable-entry virtual addresses N.N.n.x must lie in private space if n<N and in shared space if n>N, so FIG. 8 shows middle-level page-table pages on both sides of the boundary, too. And addresses N.N.N.x of entries in the top-level subtable must lie in private space if x/8<N and in shared space if x/8>N, so FIG. 8 depicts the boundary 114 as dividing that subtable.

Now, the illustrated embodiment's rule that all table-space entries be private or shared in accordance with the values they map leaves open the question of whether the self-mapper 115 entry lies in shared or private space; that entry maps top-level-subtable virtual addresses that lie on both sides of the boundary. In the illustrated embodiment, we have somewhat arbitrarily placed that entry in shared space, although placing it in private space would be just as logical. As FIG. 8 indicates, this places the private/shared boundary 114 immediately in front of address N.N.N.8N if page-table entries are eight bytes wide.

We digress at this point to make an observation concerning accesses to the page frames that contain page-table subtables. For virtual accesses to those page frames, the mapping just described predominates, and it is this mapping that is intended when the discussion below mentions virtual addressing. But the kernel may also provide alternative mappings to those page frames. That is, there may be other virtual addresses, ones that are outside the page-table range just described but typically within the space reserved for kernel use, that the page table maps to page-table entries. One use of such alternative mapping is as a substitute for physical addressing. So, when the description below mentions physical addressing, an equivalent in some instances may be to use such alternative virtual addressing.

We are now ready to discuss the present invention's providing the page table in a plurality of substructures. We provide this plurality of substructures by materializing the page 116 containing the top-level subtable in a plurality of physical page frames, whose contents differ. Since that page 116 lies partially in FIG. 7's private space 108, different page frames contain different versions of that page's contents for different processes. This much is true of other virtual pages in the private virtual-address range 108. In the particular case of FIG. 8's page 116, though, the particular page frame used for access to the top-level-subtable virtual-address page depends not only on which process is being executed but also on the virtual-address range to which the reference being translated belongs. In the illustrated embodiment, the number of different virtual-address ranges is two, and they respectively coincide with the private and shared ranges.

By providing two such page frames for the same process, we avoid the burden on context switching that using different allocation policies would otherwise impose. When a context switch of the above-described type occurs, FIG. 1's page-table base register 38 is loaded, as is conventional, with the physical-page-frame number of the page frame that contains one version of the top-level subtable. This version of that subtable is the one that contains entries that are correct for translating virtual addresses that lie within the private virtual-address range. Since they relate to the private range, of course, those entries are correct only for one process; this is why the base-register contents must be changed when a context switch occurs.

As will be described presently, though, this base value's contents affect translation only of addresses in the private virtual-address range. Addresses within the shared virtual-address range are instead based on entries in a subtable version contained in a different page frame, FIG. 3's frame 120, to which a different page-table-base register 122 refers. We will refer to this as the system page-table-base register. Whereas each process has a separate top-level page-table version of the type that page frame 76 contains, and a processor must therefore change the contents of its page-table-base register 38 as part of a context switch, a top-level subtable version of the type in page frame 120 contains only shared translations.

Therefore, no change in the system page-table-base register's 122 contents is necessary as part of the context switch. Yet processors local to different memory modules have different contents in their system page-table base register 122 to refer to different page frames of the type that page frame 120 exemplifies. This is because, in accordance with the different allocation process employed for shared memory, some of the virtual pages for which the shared-translation version provides translations are replicated in different page frames in different local memory modules. So a change in process locale may mean that the location of the page table's shared substructure changes. But this occurs transparently, i.e., without having to burden the context switch with loading new contents into a page-table page frame.

Figure 9:
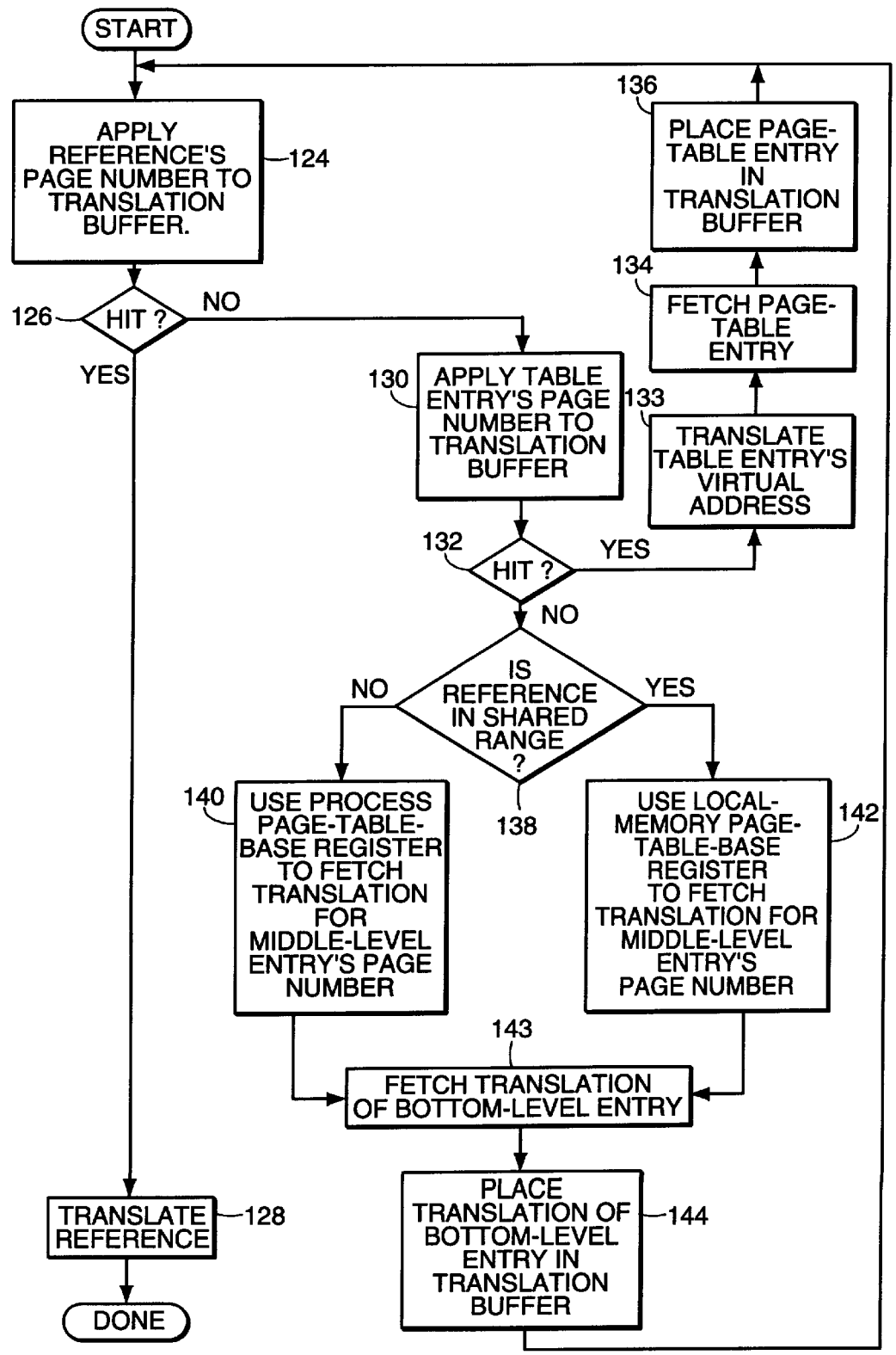
FIG. 9 is a flow chart of the operation by which virtual addresses are translated into physical address.

FIG. 9 depicts the address-translation process that the illustrated embodiment employs to implement the resultant concurrent page-table substructures. Its block 124 represents applying a memory reference to the translation buffer 22 in the conventional manner. As blocks 126 and 128 indicate, that buffer provides the requisite translation from virtual-page number to page-frame number if it has previously cached the corresponding page-table entry. This is the typical result, and the translation occurs by simply appending the reference's byte-within-page value (FIG. 3's field 60) to the page-frame number thereby determined. (As those skilled in the art will recognize, this is only one example of various schemes used in computer systems for performing similar translations, and it is apparent that the present invention's teachings apply to other such translation approaches, too.)

Although the reference's page number will more often "hit" in the translation buffer, that buffer sometimes has not cached the particular translation required. FIG. 9's branch step 126 therefore yields a negative result, and the memory-management system stops the pending instruction's execution and invokes a translation-buffer-miss routine, which the remainder of FIG. 9 illustrates. This routine's purpose is to fetch the needed translation from the page table.

As can be appreciated from the addressing scheme discussed above in connection with FIG. 3, the virtual address of the page-table entry containing the needed translation is readily determined from the reference value itself. Specifically, the byte-within-page field 60 of the entry's virtual address equals the reference's bottom-level index 94 multiplied by the number of bytes per page-table entry, which is eight in the illustrated embodiment. The middle-level-index and bottom-level-index fields 92 and 94 of the page-table entry's virtual address are respectively the reference's top-level and middle-level indexes, while the top-level index 84 of that entry's virtual address is the self-mapping index, i.e., the index of the entry in the top-level subtable that contains the number of the page frame in which that top-level subtable has been stored.

The translation-buffer-miss routine attempts to fetch the needed entry from the page table by a reference to that entry's virtual address as thus determined. Just as in the case of the original reference, the required entry's virtual address needs to be translated. To this end, the page number of the entry's virtual address is applied to the translation buffer, as block 130 indicates. As blocks 132, 133, and 134 indicate, the required page-table entry is then fetched if its virtual-address page number hits in the translation buffer. As block 136 indicates, the page-table entry thereby fetched is placed into the translation buffer. Control then returns to the process whose instruction faulted because of the original translation-buffer miss. That instruction then starts execution again: the reference is re-applied to the memory-management unit. Since the needed page-table entry is now in the translation buffer, the translation will now succeed, and the translation will be completed.

Note that the operation as described so far covers the overwhelming majority of cases: the translation buffer almost always contains a translation for the reference's page number or for that of the page-table entry that contains it. Note also that the translation process does not differ from that of a conventional multi-level page table, one that employs only one version of the top-level subtable. The reason why can be partially appreciated by considering the translation's nature under the assumption that the reference falls outside the page-table space. (This assumption will be relaxed in due course.)

For any reference that falls outside the page-table space—and these are the overwhelming majority of references—the translation employed in FIG. 9's step 124 is one that has been cached from a bottom-level subtable. As will be explained below, any such page-table entry in the translation buffer will necessarily have been loaded from the correct substructure. Also, the translation used in FIG. 9's step 130 will have been cached in the translation buffer from a middle-level page-table entry, and it will similarly be shown below that the operation of caching that entry will necessarily have been performed by relying on the proper top-level-subtable instance.

If the virtual-page number submitted to the translation buffer in step 130 does not hit, though, the translation required in order to fetch the needed middle-level-subtable entry is one that is stored in the top-level subtable. And using virtual addressing to fetch the required top-level page-table entry would mean employing the self-mapper entry, i.e., the translation-buffer entry that associates the virtual-page number of the top-level subtable with the physical page frame that contains it. But a cached version of the self-mapping could point to the wrong version of this top-level subtable. If the original reference's value did not fall within the shared range, then the number of the page frame in which the subtable containing the needed translation can be found should be determined by looking into FIG. 3's page-table-base register 38. Otherwise, the identity of that page frame should be determined by consulting the system page-table-base register 122. In either case the version cached may have been the other one.

So, instead of using virtual addressing to access the top-level subtable, the translation-buffer-miss handler makes a physical-address access of the correct top-level-subtable version. To this end, it performs a branching step 138 based on a comparison between the private/shared boundary 114 and the original reference's value. Now, it will be appreciated in light of the discussion above that the operating-system software can be arranged to infer the boundary value from the self-mapping index. But it may be preferable to allocate a register to that boundary's value or otherwise store it explicitly. A good reason for doing so is to provide a convenient way to switch from conventional-table operation to the present invention's concurrent-table operation.

For example, the system could be initialized with 1's in all of that register's bit positions. All virtual addressing would then be done conventionally, by way of non-concurrent, process-private page table initially. Once the system page tables are filled, conversion to concurrent-table operation could then be accomplished by merely changing that register's value to the boundary that the self-mapper index dictates.

In any event, comparison with the boundary value determines which of two alternate physical-address-based fetches 140 and 142 to perform. As block 143 indicates, the translation-buffer-miss handler then extracts the page frame number of the middle-level subtable from the fetched top-level entry, converts it to a physical address, and makes a physical-address access of the correct middle-level entry. The middle-level entry thereby fetched is placed into the translation buffer, as block 144 indicates, and the translation process for the interrupted reference instruction begins again. Ordinarily, the reference's page number will again miss in the translation buffer, but the page number of the page-table entry needed to translate it will not, so the translation process will proceed in the normal manner, employing only virtual addressing to fetch the needed page-table entry. In some embodiments, though, the step of block 144 will also fetch the bottom-level entry and place that translation for the original reference in the translation buffer. This will allow the reference to hit the translation buffer immediately.

The steps represented by blocks 124, 126, and 128 are typically a hardware-implemented aspect of a processor execution unit's memory-management circuitry. That is, the resultant translation is part of a normal memory-access operation that a single machine instruction specifies. If the virtual-address page number misses in the translation buffer, though, the negative branch resulting from decision 126 is typically implemented in a translation-buffer-miss routine. From the point of view of the process being executed, this still is simply part of a single instruction's (variable-duration) execution. And, indeed, there is no reason in principle why it could not be implemented in hardware dedicated to this purpose. In a processor designed in accordance with the reduced-instruction-set-computing (RISC) philosophy, though, it would ordinarily be implemented in a separately coded routine. Again, from the point of view of the executing process, this would still be part of a single instruction's execution, but it would actually be implemented by machine instructions of its own. In an Alpha processor, for instance, this translation-buffer-miss handler is typically implemented in privileged-architecture-library (PAL) code.

In the preceding discussion of FIG. 9's translation-buffer-miss handler, we made the assumption that the reference that was initially to be translated did not fall within FIG. 6's page-table space 112. This enabled us to state that the translation employed in step 124 came from a bottom-level subtable and that the one required for step 130 came from a middle-level subtable. We now relax that assumption and consider a (typically kernel) instruction that includes a reference to a page-table entry. To avoid any unnecessary complication of the most-frequent address-translation path, which FIG. 9's blocks 124, 126, and 128 represent, there is no provision in that part of the system for taking any steps to distinguish between references that are in the page-table range from those that are not. If the reference falls within the page-table space, though, there is a danger that the translation process may require access to a top-level subtable.

Let us suppose, for instance, that the reference is to a location in a bottom-level subtable and that the virtual-address-page number presented to the translation buffer in step 124 is one whose translation is stored in a middle-level subtable. If the translation buffer has not cached that translation, the translation-buffer-miss handler (whose first step 130 represents) will attempt to fetch that middle-level-subtable entry by way of its virtual address. Of course, determining the physical address of a middle-level-subtable entry requires a translation-buffer entry that has been cached from the top-level subtable. But there are two, different instances of that subtable, so an improper translation would occur if the translation needed to access the desired middle-level-subtable entry was cached in the translation buffer from the wrong top-level-subtable instance.

In creating page-table pages, though, the illustrated embodiment's operating system so arranges the top-level subtables that the translation buffer will never contain such an incorrect translation in such an instance. To understand the mechanism by which that system prevents such an occurrence, consider a scenario by which that translation could have been cached. In this scenario, the kernel instruction's reference refers to a middle-level page-table entry rather than a bottom-level page-table entry. If we assume an initial miss as before, then the step represented by FIG. 9's block 130 involves applying to the translation buffer the virtual-address-page number of the top-level subtable, the one of which there are two instances in physical memory. Now, suppose that the value cached was the one from the (self-mapper) entry in the wrong top-level-page-table instance. The result of the block 132 test is positive, indicating that the virtual-address-page number did indeed hit in the translation table, so the routine proceeds to block 134's step of fetching the entry from the page frame dictated by the incorrect translation.

That fetch fails, though, because of a feature that the illustrated embodiment employs in its invalid-access-exception handler. The invalid-access-exception handler is an operating-system routine that the translation-buffer-miss handler conventionally calls when the page table does not contain the requested translation. Many subtable entries are actually indications that the table currently has no translation for the virtual-address page number that the entry is intended to contain. In a page-table entry having FIG. 4's format 88, one of the purposes of a flags field 146 is to indicate the absence of a translation.

A possible reason for the absence of a translation is that the page (or pages, in the case of a higher-level subtable) referred to lie in regions of virtual-address space that are in use by the process but not currently materialized in memory. A cleared valid flag 147 would indicate that condition. Another possible reason is that the referred-to page or pages lie in a region not being used by the process at all. A conventional use of a read-enable flag 148 is to indicate whether the latter situation prevails.

(Those skilled in the art will recognize that it is typical for an entry to have more than one read-enable flag and more than one write-enable flag; different flags are associated with differently privileged modes of operation. In the present discussion we are assuming that the code in which the reference to a page-table entry occurred is kernel code, that the mode of operation is the kernel (most privileged) mode, and that the flag in question is a kernel-mode flag. In any page-table entry containing a translation to a page-table-page-containing page frame, all less-privileged-mode read-enable flags would typically be cleared, since direct access to the page table should occur only when the processor is operating in kernel mode.)

It is a conventional function of the translation-buffer-miss handler to verify that any page-table entry it fetches has a set read-enable-flag value. If that flag has been cleared, the PAL-code translation-buffer-miss handler throws an exception, triggering the processor to invoke the operating system's invalid-access exception handler. This is a conventional aspect of virtual-address resolution: it must be performed even for conventional memory-management systems, which do not employ multiple page-table substructures.

The illustrated embodiment takes advantage of this flag-checking mechanism by specially marking certain of the top-level subtable entries to trigger such an exception. Specifically, the top-level-subtable instance associated with the shared virtual-address space has all of its entries that fall within the private virtual-address space marked with cleared read- and write-enable flags 148 and 150. Similarly, the top-level-page-table instance associated with the private virtual-address space has all of its entries that fall within the shared virtual-address space marked with cleared read- and write-enable flags 148 and 150. So, if the top-level page-table entry that the translation-buffer-miss handler fetches in FIG. 9's step 134 is thus marked, that handler throws the invalid-access exception. Since checking such flags and throwing such an exception if they have the wrong values is a conventional part of fetching page-table entries for caching in the translation buffer, requiring it does not place an added burden on the translation operation.

The invalid-access exception causes FIG. 9's translation-buffer-miss handler to terminate after invoking the operating system's invalid-access-exception handler. This exception handler has been arranged in the illustrated embodiment to determine whether a true access violation has actually occurred. Specifically, it first determines by inspecting the virtual-page number applied to the translation buffer in step 130 whether the entry to which step 134 is directed is in a top-level subtable. If not, the cleared flag must really indicate an access violation—i.e., that the requested page has not been materialized in memory—since in the illustrated embodiment only top-level-subtable entries use such a flag to indicate that the top-level-subtable version being accessed is the wrong one. Exception handling therefore continues in the normal manner.

Otherwise, the handler compares the faulting reference with the shared/physical boundary to determine which of the two physical page frames identified by FIG. 3's registers 38 and 122 is the one that properly contains the page translation for that reference, and it fetches the proper entry by physical addressing. If the entry thus fetched also has a cleared read-enable flag, that flag again really indicates an access violation, so the handler again proceeds normally.

If the fetched entry's read-enable flag is set, though, indicating that the requested page actually is in use, the handler infers that the exception actually resulted from an attempt to access the wrong top-level-subtable instance. It therefore flushes from the translation buffer the current translation for the virtual page containing the top-level subtable. It then returns control to the process instruction for which the page fault occurred, i.e., to the kernel instruction that entered the FIG. 9 operation to translate the virtual address of an entry in a middle-level subtable.

Since the access-violation exception handler has flushed the top-level-subtable entry from the translation buffer, FIG. 9's decision 132 has a negative result this time. The subsequent performance of the above-described steps represented by FIG. 9's blocks 138, 140, 142, 143, and 144 results in the translation buffer's receiving the top-level-subtable-page translation that yields the correct physical-address page-frame number. That is, the resultant translation yields the number of the correct page frame in which to find the middle-level-subtable entry whose virtual address was to be translated.

The mechanisms just described do not deal with the situation in which a top-level-subtable entry is itself the target of the virtual-address access, that is, in which it is the top-level-subtable's virtual-address page that is applied to the translation buffer 22 in FIG. 9's step 124. In such a case, the translation-buffer entry to be used to translate the top-level-subtable-entry's virtual address is a copy of the top-level subtable's self-mapper entry. This particular entry is distinguished by the fact that it is "correct" in both instances of the top-level page-table entry: both actually do identify page frames that have been allocated to page-table pages. This means that its read-enable flag is set in both instances, so this entry differs from other top-level-subtable entries in that there is nothing to prevent the "wrong" instance from having been cached in the translation buffer, and the translation buffer may therefore contain either one.

Without more, the operation would therefore continue through step 128, where the entry's physical address would be obtained by concatenating the virtual address's byte-within-page bits with the bits of the page-frame number supplied by the translation buffer. Those bits could point to a top-level-subtable entry on either side of the private/shared boundary. The accessed location may in fact contain a cleared read-enable flag, but those contents are not encountered as part of the process of attempting to load the translation buffer, so its flags are not tested. The "wrong" value of the virtually addressed entry would therefore result.

The way in which the illustrated embodiment deals with this possibility for read accesses differs slightly from the way in which it deals with it for write accesses. To prevent incorrect address translations during read accesses, the illustrated embodiment sets FIG. 4's fault-on-read flag 152 in the self-mapping entry, i.e., in the page-table entry that contains the translation for virtual-address page N.N.N. When the page-table entry encountered in the translation buffer in FIG. 9's step 124 has the fault-on-read flag set, the memory-management unit throws an exception if the instruction containing the reference to be translated is a read instruction. But any virtual-address page to be translated for any read operation directed to the top-level subtable is always N.N.N. Since the illustrated embodiment has the fault-on-read flag in that entry set, any attempt to read from the top-level subtable by using its virtual address as a reference results in the read instruction's being interrupted and in a transfer of control to an operating-system exception handler.

The fault-on-read exception handler is arranged to note that the faulting instruction is a read operation directed to the virtual-address page containing the top-level subtable, and it infers from this fact that it must perform that instruction by physical addressing so as to insure that the proper top-level-subtable instance is accessed. It notes whether the reference's byte-within-page value falls above or below the private/shared boundary, selects the physical page frame accordingly, and performs the faulting instruction by physically addressing the desired location in the proper physical page frame. Since the handler has performed the access operation in place of the faulting process instruction, it advances the process's program counter to the next instruction before returning control to it.

Since there are valid self-mapper entries in both top-level-subtable versions, though, this comparison of the reference value with the private/shared boundary does not always work if the target virtual address was that of the self-mapper entry itself. For instance, the self-mapper entry 115 in the private-space version of the top-level subtable lies on the opposite side of the private/shared boundary 114 from the private space that the self-mapper entry maps. So, for this one case only, step 138 in FIG. 9 cannot generate the correct answer. But the illustrated embodiment's translation process does not treat this occurrence specially. Instead, it relies on the operating-system kernel to prevent it, i.e., to avoid read or write virtual references to the self-mapper entry in either top-level-subtable instance.

A mechanism similar to the one just described for ensuring that read instructions containing virtual references to the top-level subtable access the correct page frame can be used for the same purpose when the instruction is a write access that references that subtable. Specifically, the illustrated embodiment write protects the top-level subtable; i.e., the write-enable flag in each self-mapper entry is cleared. Since this flag is encountered in the translation buffer during a translation that would otherwise yield a page frame containing a version of the top-level subtable, the write operation does not occur.

The illustrated embodiment's above-described features would typically be provided by configuring a computer system with instructions that have been read from some persistent-storage medium, which FIG. 1 represents by a disk-drive symbol 156. The operating-system code that loads in the page tables during system initialization and program loading and revises them during process execution would be read from that storage medium into system memory through the medium of computer signals that represent the code for those instructions and their loading. Computer signals are most commonly of the electrical variety but can also be electromagnetic, in the radio- or optical-wavelength range. As was mentioned above, the exception handlers described above would also largely be embodied in operating-system code thus loaded. The PAL code that implements the translation-buffer-miss handler in the illustrated embodiment may also be stored in the same medium, but it is also practical for it to be stored separately. For example, it may be stored in read-only memory or some other persistent-storage medium separate from a computer disk that would typically contain other code.

Although the invention has been described by reference to a specific embodiment, its teachings have broader application. Its broader teachings are clearly applicable to numbers of substructures greater than two, for instance. Also, the demarcation lines between the ranges translated by the different substructures do not have to be the same as those that divide shared space from private. And allocation policies that apply to different ranges do not have to be distinguished by replication or lack thereof. The present invention can therefore be implemented in a wide range of embodiments and constitutes a significant advance in the art.

What is claimed is:

1. For employing at least one processor in a computer system to translate a reference virtual address of a location within a virtual page into a physical address, within a memory accessible by each said processor and organized into page frames that can contain virtual-address pages, of a corresponding location within one said page frame that contains that virtual page, a method comprising:
   A) providing in the memory, for each process in a set of at least one thereof, a composite page table that includes a plurality of constituent page tables, each of which contains page-table entries, is associated with a separate virtual-address range and a separate base-address value that identifies the associated constituent page table's physical location, and maps that separate base-address value to a common virtual address, to which each other constituent page table maps the separate base-address value with which it is associated;
   B) providing in each said processor a translation buffer containing page-table entries loaded from the constituent page tables;
   C) fetching from the translation buffer the identity of the physical page frame associated with the reference virtual address's virtual page by a page-table entry loaded into the translation buffer from the constituent page table associated with the separate virtual-address range in which the reference virtual address falls; and
   D) generating the physical address of a location within the page frame whose identity was thus fetched.

2. A method as defined in claim 1 wherein the step of fetching the physical page frame's identity from the translation buffer includes:
   A) determining whether the translation buffer contains an entry that associates a page frame with the reference virtual address's virtual-address page; and
   B) if the translation buffer contains no page-table entry associating the reference virtual address's page with a page frame, loading the translation buffer from the constituent page table associated with the separate virtual-address range in which the reference virtual address falls before fetching the physical page frame's identity from the translation buffer.

3. A method as defined in claim 2 wherein the step of loading the translation buffer from the constituent page table includes:
   A) requesting from the translation buffer the identity of the page frame associated thereby with at least one page-table virtual-address page used by the composite page table to associate the reference's virtual-address page with a physical page table; and
   B) employing one of the separate base-address values without translation to access one of the page tables only if the translation buffer contains no entry associating at least one such page-table virtual-address page with a page frame, the separate base-address value thereby employed being the one associated with the page table with which the separate virtual-address range in which the reference falls is associated.

4. A method as defined in claim 3 wherein:
   A) the computer system includes a boundary register;
   B) the separate computer system's employing one of the base-address values without translation to access one of the page tables includes performing a comparison between the reference virtual address and the contents of the boundary register; and
   C) the separate base-address value employed to access one of the page tables depends on the result of that comparison.

5. A method as defined in claim 1 wherein:
   A) the constituent page tables are multi-level page tables, each of which consists of a top-level subtable and lower-level subtables whose physical locations are identified by that multi-level page table's top-level subtable or another of the lower-level subtables; and
   B) each separate base-address value identifies the physical location of the top-level subtable with which it is associated.

6. A method as defined in claim 5 wherein:
   A) each top-level subtable includes a self-mapper entry that identifies the physical location of that top-level subtable; and
   B) the virtual addresses of all self-mapper entries are the same.

7. A method as defined in claim 6 wherein:
   A) the number of concurrently self-mapping constituent page tables is two;
   B) the separate virtual-address range associated with a first of the constituent page tables includes no virtual addresses greater than that of the self-mapper; and
   C) the separate virtual-address range associated with a second of the constituent page tables includes no virtual addresses less than that of the self-mapper.

8. A method as defined in claim 1 wherein:
   A) the set of at least one process includes a plurality of said processes;

B) a first of the constituent page tables of each composite page table is a process-dependent page table, whose contents depend on the process for which the composite page table in which it is included is provided; and C) a second of the constituent page tables of each composite page table is a process-independent page table, whose contents do not depend on the process for which the composite page table in which it is included is provided.

9. A method as defined in claim 8 wherein:

A) the constituent page tables are multi-level page tables, each of which consists of a top-level subtable and lower-level subtables whose physical locations are identified by that multi-level page table's top-level subtable or another of the lower-level subtables; and B) each base-address value identifies the physical location of the top-level subtable with which it is associated.

10. A method as defined in claim 1 wherein:

A) the set of at least one processor includes a plurality of processors, to which the memory is accessible, that together execute the set of at least one process;

B) the memory includes a plurality of memory modules, each of which is associated with a separate set of at least one said processor local thereto;

C) a first of the constituent page tables of each composite page table is a module-dependent page table, whose contents depend on the memory module with which the processor is associated that is executing the process for which that composite page table is provided; and D) a second of the constituent page tables of each composite page table is a module-independent page table, whose contents do not depend on the memory module with which the processor is associated that is executing the process for which that composite page table is provided.

11. A method as defined in claim 10 wherein:

A) the constituent page tables are multi-level page tables, each of which consists of a top-level subtable and lower-level subtables whose physical locations are identified by that multi-level page table's top-level subtable or another of the lower-level subtables; and B) each separate base-address value identifies the physical location of the top-level subtable with which it is associated.

12. A method as defined in claim 11 wherein:

A) each top-level subtable includes a self-mapper entry that identifies the physical location of that top-level subtable; and B) the virtual addresses of all self-mapper entries are the same.

13. A method as defined in claim 12 wherein:

A) the number of concurrently self-mapping constituent page tables is two;

B) the separate virtual-address range associated with a first of the constituent page tables includes no virtual addresses greater than that of the self-mapper; and C) the separate virtual-address range associated with a second of the constituent page tables includes no virtual addresses less than that of the self-mapper.

14. A method as defined in claim 10 wherein:

A) the set of at least one process includes a plurality of said processes;

B) one of the first and second constituent page tables of each composite page table is a process-dependent page table, whose contents depend on the process for which the composite page table in which it is included is provided; and C) the other of the first and second constituent page tables of each composite page table is a process-independent page table, whose contents do not depend on the process for which the composite page table in which it is included is provided.

15. A computer system that includes a set of at least one processor and wherein:

A) said computer system includes a memory accessible by each said processor and organized into page frames that can contain virtual-address pages;

B) each said processor includes a translation buffer that can contain page-table entries that associate virtual-address pages with the page frames that contain them; and C) said computer system is configured to:
  i) employ said set of at least one processor to execute a set of at least one process;
  ii) provide in the memory, for each said process, a different composite page table that includes a plurality of constituent page tables, each of which contains page-table entries, is associated with a separate virtual-address range and a separate base-address value that identifies the associated constituent page table's physical location, and maps that separate base-address value to a common virtual address, to which each other constituent page table maps the separate base-address value with which it is associated;
  iii) load selected ones of said page-table entries into each said translation buffer; and
  iv) translate a reference virtual address of a location within a virtual page into a physical address by:
    a) fetching from the translation buffer the identity of the physical page frame associated with the reference virtual address's virtual page by a page-table entry loaded into the translation buffer from the constituent page table associated with the separate virtual-address range in which the reference virtual address falls; and
    b) generating the physical address of a location within the page frame whose identity was thus fetched.

16. A computer system as defined in claim 15 wherein the computer system's fetching of the physical page frame's identity from the translation buffer includes:

A) determining whether the translation buffer contains an entry that associates a page frame with the reference virtual address's virtual-address page; and B) if the translation buffer contains no page-table entry associating the reference virtual address's page with a page frame, loading the translation buffer from the constituent page table associated with the separate virtual-address range in which the reference virtual address falls before fetching the physical page frame's identity from the translation buffer.

17. A computer system as defined in claim 16 wherein the computer system's loading of the translation buffer from the constituent page table includes:

A) requesting from the translation buffer the identity of the page frame associated thereby with at least one page-table virtual-address page used by the composite page table to associate the reference's virtual-address page with a physical page table; and B) employing one of the separate base-address values without translation to access one of the page tables only if the translation buffer contains no entry associating at least one such page-table virtual-address page with a page frame, the separate base-address value thereby employed being the one associated with the page table with which the separate virtual-address range in which the reference falls is associated.

18. A computer system as defined in claim 17 wherein:
A) the computer system includes a boundary register;
B) the computer system's employing one of the separate base-address values without translation to access one of the page tables includes performing a comparison between the reference virtual address and the contents of the boundary register; and
C) the separate base-address value employed to access one of the page tables depends on the result of that comparison.

19. A computer system as defined in claim 15 wherein:
A) the constituent page tables are multi-level page tables, each of which consists of a top-level subtable and lower-level subtables whose physical locations are identified by that multi-level page table's top-level subtable or another of the lower-level subtables; and
B) each separate base-address value identifies the physical location of the top-level subtable with which it is associated.

20. A computer system as defined in claim 19 wherein:
A) each top-level subtable includes a self-mapper entry that identifies the physical location of that top-level subtable; and
B) the virtual addresses of all self-mapper entries are the same.

21. A computer system as defined in claim 20 wherein:
A) the number of concurrently self-mapping constituent page tables is two;
B) the separate virtual-address range associated with a first of the constituent page tables includes no virtual addresses greater than that of the self-mapper; and
C) the separate virtual-address range associated with a second of the constituent page tables includes no virtual addresses less than that of the self-mapper.

22. A computer system as defined in claim 15 wherein:
A) the set of at least one process includes a plurality of said processes;
B) a first of the constituent page tables of each composite page table is a process-dependent page table, whose contents depend on the process for which the composite page table in which it is included is provided; and
C) a second of the constituent page tables of each composite page table is a process-independent page table, whose contents do not depend on the process for which the composite page table in which it is included is provided.

23. A computer system as defined in claim 22 wherein:
A) the constituent page tables are multi-level page tables, each of which consists of a top-level subtable and lower-level subtables whose physical locations are identified by that multi-level page table's top-level subtable or another of the lower-level subtables; and
B) each base-address value identifies the physical location of the top-level subtable with which it is associated.

24. A computer system as defined in claim 15 wherein:
A) the set of at least one processor includes a plurality of processors, to which the memory is accessible, that together execute the set of at least one process;
B) the memory includes a plurality of memory modules, each of which is associated with a separate set of at least one said processor local thereto;
C) a first of the constituent page tables of each composite page table is a module-dependent page table, whose contents depend on the memory module with which the processor is associated that is executing the process for which that composite page table is provided; and
D) a second of the constituent page tables of each composite page table is a module-independent page table, whose contents do not depend on the memory module with which the processor is associated that is executing the process for which that composite page table is provided.

25. A computer system as defined in claim 24 wherein:
A) the constituent page tables are multi-level page tables, each of which consists of a top-level subtable and lower-level subtables whose physical locations are identified by that multi-level page table's top-level subtable or another of the lower-level subtables; and
B) each separate base-address value identifies the physical location of the top-level subtable with which it is associated.

26. A computer system as defined in claim 25 wherein:
A) each top-level subtable includes a self-mapper entry that identifies the physical location of that top-level subtable; and
B) the virtual addresses of all self-mapper entries are the same.

27. A computer system as defined in claim 26 wherein:
A) the number of concurrently self-mapping constituent page tables is two;
B) the separate virtual-address range associated with a first of the constituent page tables includes no virtual addresses greater than that of the self-mapper; and
C) the separate virtual-address range associated with a second of the constituent page tables includes no virtual addresses less than that of the self-mapper.

28. A computer system as defined in claim 24 wherein:
A) the set of at least one process includes a plurality of said processes;
B) one of the first and second constituent page tables of each composite page table is a process-dependent page table, whose contents depend on the process for which the composite page table in which it is included is provided; and
C) the other of the first and second constituent page tables of each composite page table is a process-independent page table, whose contents do not depend on the process for which the composite page table in which it is included is provided.

29. A storage medium containing instructions readable, by a computer system that includes a memory organized into page frames in which virtual-address pages can reside and includes a set of at least one processor of which each can access the memory and includes a translation buffer that can contain page-table entries that associate virtual-address pages with the page frames that contain them, to configure the computer system to:
A) employ said set of at least one processor to execute a set of at least one process;
B) provide in the memory for each said process a different composite page table that includes a plurality of constituent page tables, each of which contains page-table entries, is associated with a separate virtual-address range and a separate base-address value that identifies the associated constituent page table's physical location, and maps that separate base-address value to a common virtual address, to which each other constituent page table maps the separate base-address value with which it is associated;

C) load selected ones of said page-table entries into each said translation buffer; and D) translate a reference virtual address of a location within a virtual page into a physical address by:
   i) fetching from the translation buffer the identity of the physical page frame associated with the reference virtual address's virtual page by a page-table entry loaded into the translation buffer from the constituent page table associated with the separate virtual-address range in which the reference virtual address falls; and
   ii) generating the physical address of a location within the page frame whose identity was thus fetched.

30. A storage medium as defined in claim 29 wherein the computer system's fetching of the physical page frame's identity from the translation buffer includes:
   A) determining whether the translation buffer contains an entry that associates a page frame with the reference virtual address's virtual-address page; and
   B) if the translation buffer contains no page-table entry associating the reference virtual address's page with a page frame, loading the translation buffer from the constituent page table associated with the separate virtual-address range in which the reference virtual address falls before fetching the physical page frame's identity from the translation buffer.

31. A storage medium as defined in claim 30 wherein the computer system's loading of the translation buffer from the constituent page table includes:
   A) requesting from the translation buffer the identity of the page frame associated thereby with at least one page-table virtual-address page used by the composite page table to associate the reference's virtual-address page with a physical page table; and
   B) employing one of the separate base-address values without translation to access one of the page tables only if the translation buffer contains no entry associating at least one such page-table virtual-address page with a page frame, the separate base-address value thereby employed being the one associated with the page table with which the separate virtual-address range in which the reference falls is associated.

32. A storage medium as defined in claim 31 wherein:
   A) the computer system includes a boundary register;
   B) the computer system's employing one of the separate base-address values without translation to access one of the page tables includes performing a comparison between the reference virtual address and the contents of the boundary register; and
   C) the separate base-address value employed to access one of the page tables depends on the result of that comparison.

33. A storage medium as defined in claim 29 wherein:
   A) the constituent page tables are multi-level page tables, each of which consists of a top-level subtable and lower-level subtables whose physical locations are identified by that multi-level page table's top-level subtable or another of the lower-level subtables; and
   B) each separate base-address value identifies the physical location of the top-level subtable with which it is associated.

34. A storage medium as defined in claim 33 wherein:
   A) each top-level subtable includes a self-mapper entry that identifies the physical location of that top-level subtable; and
   B) the virtual addresses of all self-mapper entries are the same.

35. A storage medium as defined in claim 34 wherein:
   A) the number of concurrently self-mapping constituent page tables is two;
   B) the separate virtual-address range associated with a first of the constituent page tables includes no virtual addresses greater than that of the self-mapper; and
   C) the separate virtual-address range associated with a second of the constituent page tables includes no virtual addresses less than that of the self-mapper.

36. A storage medium as defined in claim 29 wherein:
   A) the set of at least one process includes a plurality of said processes;
   B) a first of the constituent page tables of each composite page table is a process-dependent page table, whose contents depend on the process for which the composite page table in which it is included is provided; and
   C) a second of the constituent page tables of each composite page table is a process-independent page table, whose contents do not depend on the process for which the composite page table in which it is included is provided.

37. A storage medium as defined in claim 36 wherein:
   A) the constituent page tables are multi-level page tables, each of which consists of a top-level subtable and lower-level subtables whose physical locations are identified by that multi-level page table's top-level subtable or another of the lower-level subtables; and
   B) each base-address value identifies the physical location of the top-level subtable with which it is associated.

38. A storage medium as defined in claim 29 wherein:
   A) the set of at least one processor includes a plurality of processors, to which the memory is accessible, that together execute the set of at least one process;
   B) the memory includes a plurality of memory modules, each of which is associated with a separate set of at least one said processor local thereto;
   C) a first of the constituent page tables of each composite page table is a module-dependent page table, whose contents depend on the memory module with which the processor is associated that is executing the process for which that composite page table is provided; and
   D) a second of the constituent page tables of each composite page table is a module-independent page table, whose contents do not depend on the memory module with which the processor is associated that is executing the process for which that composite page table is provided.

39. A storage medium as defined in claim 38 wherein:
   A) the constituent page tables are multi-level page tables, each of which consists of a top-level subtable and lower-level subtables whose physical locations are identified by that multi-level page table's top-level subtable or another of the lower-level subtables; and
   B) each separate base-address value identifies the physical location of the top-level subtable with which it is associated.

40. A storage medium as defined in claim 39 wherein:
   A) each top-level subtable includes a self-mapper entry that identifies the physical location of that top-level subtable; and B) the virtual addresses of all self-mapper entries are the same.

41. A storage medium as defined in claim 40 wherein:

A) the number of concurrently self-mapping constituent page tables is two;

B) the separate virtual-address range associated with a first of the constituent page tables includes no virtual addresses greater than that of the self-mapper; and C) the separate virtual-address range associated with a second of the constituent page tables includes no virtual addresses less than that of the self-mapper.

42. A storage medium as defined in claim 38 wherein:

A) the set of at least one process includes a plurality of said processes;

B) one of the first and second constituent page tables of each composite page table is a process-dependent page table, whose contents depend on the process for which the composite page table in which it is included is provided; and C) the other of the first and second constituent page tables of each composite page table is a process-independent page table, whose contents do not depend on the process for which the composite page table in which it is included is provided.

43. A computer signal representing instructions readable, by a computer system that includes a memory organized into page frames in which virtual-address pages can reside and includes a set of at least one processor of which each can access the memory and includes a translation buffer that can contain page-table entries that associate virtual-address pages with the page frames that contain them, to configure the computer system to:

A) employ said set of at least one processor to execute a set of at least one process;

B) provide in the memory for each said process a different composite page table that includes a plurality of constituent page tables, each of which contains page-table entries, is associated with a separate virtual-address range and a separate base-address value that identifies the associated constituent page table's physical location, and maps that separate base-address value to a common virtual address, to which each other constituent page table maps the separate base-address value with which it is associated;

C) load selected ones of said page-table entries into each said translation buffer; and D) translate a reference virtual address of a location within a virtual page into a physical address by:

i) fetching from the translation buffer the identity of the physical page frame associated with the reference virtual address's virtual page by a page-table entry loaded into the translation buffer from the constituent page table associated with the separate virtual-address range in which the reference virtual address falls; and ii) generating the physical address of a location within the page frame whose identity was thus fetched.

44. A computer signal as defined in claim 43 wherein the computer system's fetching of the physical page frame's identity from the translation buffer includes:

A) determining whether the translation buffer contains an entry that associates a page frame with the reference virtual address's virtual-address page; and B) if the translation buffer contains no page-table entry associating the reference virtual address's page with a page frame, loading the translation buffer from the constituent page table associated with the separate virtual-address range in which the reference virtual address falls before fetching the physical page frame's identity from the translation buffer.

45. A computer signal as defined in claim 44 wherein the computer system's loading of the translation buffer from the constituent page table includes:

A) requesting from the translation buffer the identity of the page frame associated thereby with at least one page-table virtual-address page used by the composite page table to associate the reference's virtual-address page with a physical page table; and B) employing one of the separate base-address values without translation to access one of the page tables only if the translation buffer contains no entry associating at least one such page-table virtual-address page with a page frame, the separate base-address value thereby employed being the one associated with the page table with which the separate virtual-address range in which the reference falls is associated.

46. A computer signal as defined in claim 44 wherein:

A) the computer system includes a boundary register;

B) the computer system's employing one of the separate base-address values without translation to access one of the page tables includes performing a comparison between the reference virtual address and the contents of the boundary register; and C) the separate base-address value employed to access one of the page tables depends on the result of that comparison.

47. A computer signal as defined in claim 43 wherein:

A) the constituent page tables are multi-level page tables, each of which consists of a top-level subtable and lower-level subtables whose physical locations are identified by that multi-level page table's top-level subtable or another of the lower-level subtables; and B) each separate base-address value identifies the physical location of the top-level subtable with which it is associated.

48. A computer signal as defined in claim 47 wherein:

A) each top-level subtable includes a self-mapper entry that identifies the physical location of that top-level subtable; and B) the virtual addresses of all self-mapper entries are the same.

49. A computer signal as defined in claim 48 wherein:

A) the number of concurrently self-mapping constituent page tables is two;

B) the separate virtual-address range associated with a first of the constituent page tables includes no virtual addresses greater than that of the self-mapper; and C) the separate virtual-address range associated with a second of the constituent page tables includes no virtual addresses less than that of the self-mapper.

50. A computer signal as defined in claim 43 wherein:

A) the set of at least one process includes a plurality of said processes;

B) a first of the constituent page tables of each composite page table is a process-dependent page table, whose contents depend on the process for which the composite page table in which it is included is provided; and C) a second of the constituent page tables of each composite page table is a process-independent page table, whose contents do not depend on the process for which the composite page table in which it is included is provided.

51. A computer signal as defined in claim 50 wherein:

A) the constituent page tables are multi-level page tables, each of which consists of a top-level subtable and lower-level subtables whose physical locations are identified by that multi-level page table's top-level subtable or another of the lower-level subtables; and B) each base-address value identifies the physical location of the top-level subtable with which it is associated.

52. A computer signal as defined in claim 43 wherein:

A) the set of at least one processor includes a plurality of processors, to which the memory is accessible, that together execute the set of at least one process;

B) the memory includes a plurality of memory modules, each of which is associated with a separate set of at least one said processor local thereto;

C) a first of the constituent page tables of each composite page table is a module-dependent page table, whose contents depend on the memory module with which the processor is associated that is executing the process for which that composite page table is provided; and D) a second of the constituent page tables of each composite page table is a module-independent page table, whose contents do not depend on the memory module with which the processor is associated that is executing the process for which that composite page table is provided.

53. A computer signal as defined in claim 52 wherein:

A) the constituent page tables are multi-level page tables, each of which consists of a top-level subtable and lower-level subtables whose physical locations are identified by that multi-level page table's top-level subtable or another of the lower-level subtables; and B) each separate base-address value identifies the physical location of the top-level subtable with which it is associated.

54. A computer signal as defined in claim 53 wherein:

A) each top-level subtable includes a self-mapper entry that identifies the physical location of that top-level subtable; and B) the virtual addresses of all self-mapper entries are the same.

55. A computer signal as defined in claim 54 wherein:

A) the number of concurrently self-mapping constituent page tables is two;

B) the separate virtual-address range associated with a first of the constituent page tables includes no virtual addresses greater than that of the self-mapper; and C) the separate virtual-address range associated with a second of the constituent page tables includes no virtual addresses less than that of the self-mapper.

56. A computer signal as defined in claim 52 wherein:

A) the set of at least one process includes a plurality of said processes;

B) one of the first and second constituent page tables of each composite page table is a process-dependent page table, whose contents depend on the process for which the composite page table in which it is included is provided; and C) the other of the first and second constituent page tables of each composite page table is a process-independent page table, whose contents do not depend on the process for which the composite page table in which it is included is provided.

57. A computer system that includes a memory organized into page frames in which virtual-address pages can reside and includes a set of at least one processor of which each can access the memory, includes a translation buffer that can contain page-table entries that associate virtual-address pages with the page frames that contain them, and comprises:

A) means for executing a set of at least one process;

B) means for providing, for each said process, a different composite page table that includes a plurality of constituent page tables, each of which contains page-table entries, is associated with a separate virtual-address range and a separate base-address value that identifies the associated constituent page table's physical location, and maps that separate base-address value to a common virtual address, to which each other constituent page table maps the separate base-address value with which it is associated;

C) means for loading selected ones of said page-table entries into each said translation buffer; and D) means for translating a reference virtual address of a location within a virtual page into a physical address by:

i) fetching from the translation buffer the identity of the physical page frame associated with the reference virtual address's virtual page by a page-table entry loaded into the translation buffer from the constituent page table associated with the separate virtual-address range in which the reference virtual address falls; and ii) generating the physical address of a location within the page frame whose identity was thus fetched.

* * * * *